United States Patent
Milia

(10) Patent No.: US 6,821,322 B2
(45) Date of Patent: Nov. 23, 2004

(54) SEPARATORS FOR THREE-PHASE OR TWO-PHASE FLUID MIXTURES REALIZED WITH A CENTRIFUGAL DEVICE DESIGNED FOR THE SEPARATION OF THE GAS FROM THE LIQUID MIXTURE

(75) Inventor: Salvatore Milia, Milan (IT)

(73) Assignee: Ing. Milia & C. S.r.l., Milan (IT)

( * ) Notice: Subject to any disclaimer, the term of this patent is extended or adjusted under 35 U.S.C. 154(b) by 34 days.

(21) Appl. No.: 10/366,258

(22) Filed: Feb. 13, 2003

(65) Prior Publication Data

US 2003/0154860 A1 Aug. 21, 2003

(30) Foreign Application Priority Data

Feb. 19, 2002 (IT) ...................................... MI2002A0329

(51) Int. Cl.[7] ............................................... B01D 19/00
(52) U.S. Cl. .............................. 96/209; 95/261; 96/212; 96/215; 96/216; 210/512.2
(58) Field of Search ......................... 96/208, 209, 212, 96/215, 216; 95/261; 210/512.2

(56) References Cited

U.S. PATENT DOCUMENTS

| | | | | |
|---|---|---|---|---|
| 2,705,053 A | * | 3/1955 | Morris ......................... | 96/212 |
| 2,983,331 A | * | 5/1961 | Helsley, Jr. .................. | 96/212 |
| 3,330,097 A | * | 7/1967 | Ammon ....................... | 96/212 |
| 3,452,518 A | * | 7/1969 | Skaug et al. .................. | 96/216 |
| 4,390,351 A | * | 6/1983 | Matsui et al. ................. | 96/209 |
| 4,855,050 A | * | 8/1989 | Senyard, Sr. et al. .... | 210/512.1 |
| 5,314,529 A | * | 5/1994 | Tilton et al. .................. | 96/204 |
| 5,827,357 A | * | 10/1998 | Farion ......................... | 95/253 |
| 6,214,220 B1 | * | 4/2001 | Favret, Jr. ................... | 210/188 |
| 6,409,808 B1 | * | 6/2002 | Chamberlain et al. ........ | 96/182 |

* cited by examiner

Primary Examiner—Richard L. Chiesa
(74) Attorney, Agent, or Firm—Hedman & Costigan, P.C.

(57) ABSTRACT

The present invention refers to three or two phase separators provided with an inlet centrifugal device (40, 70) for the preliminary separation of the gas phase from the fluid mixture; the centrifugal separation device includes a first stage (40', 70') having a circular section delimited by a wall (42, 63) and by the external surface of the second stage plate and a second stage (40", 70"), internal and coaxial to the first stage, realized by a plate rolled as an 'Archimedean' spiral around the vertical axis common to the two stages of the centrifugal separation device, in order to operate the separation of the gas phase from the liquids, obliging the flowing fluid to follow a circular path that brings the liquid and its droplets to adhere to the wall surface (42, 63) and to the internal surface of the spiral (47), obtaining their separation from the mixture.

12 Claims, 6 Drawing Sheets

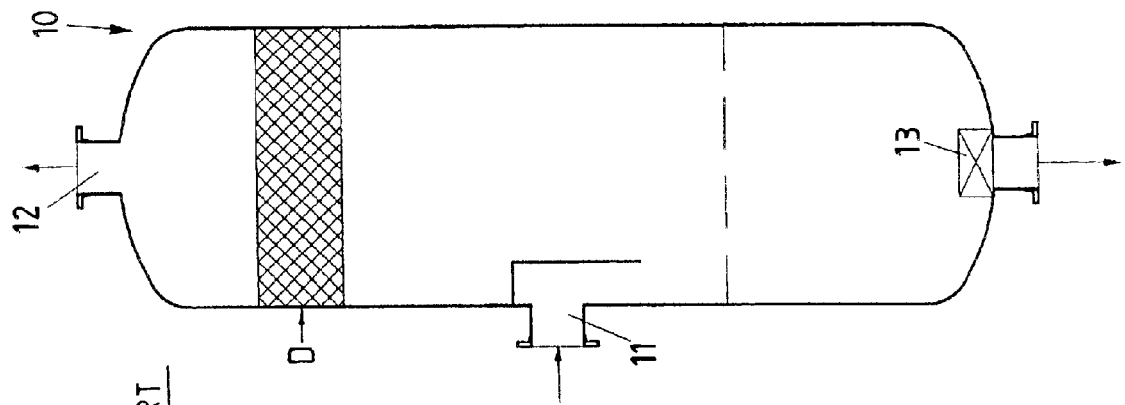
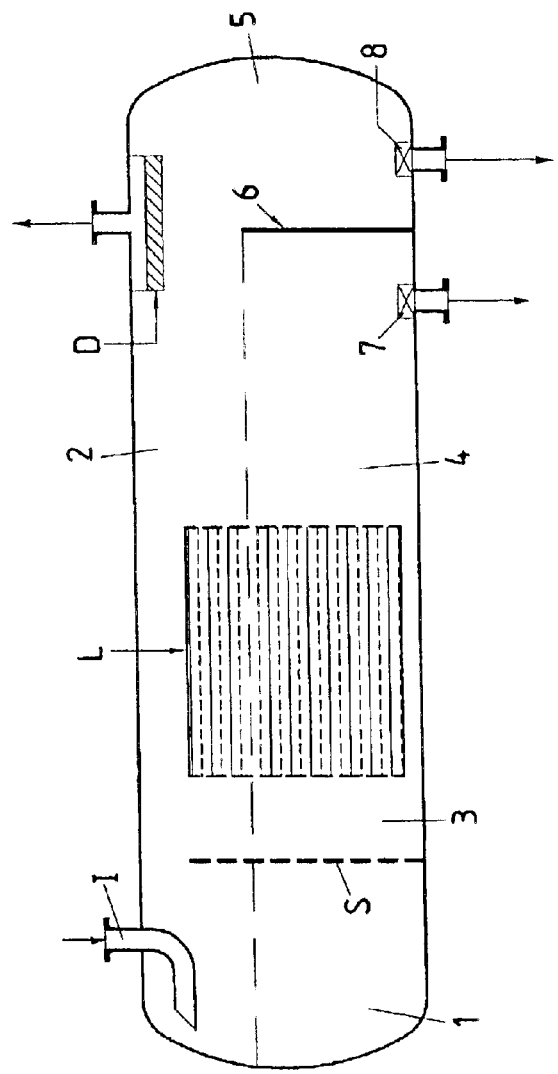

SEPARATORS FOR THREE-PHASE OR TWO-PHASE FLUID MIXTURES REALIZED WITH A CENTRIFUGAL DEVICE DESIGNED FOR THE SEPARATION OF THE GAS FROM THE LIQUID MIXTURE

BACKGROUND OF THE INVENTION

The present invention concerns separators for three or two phase mixtures provided with an inlet centrifugal device for the separation from the fluid of the gas phase.

The separators of three or two phase mixtures, are used in the production of oil, and in particular for the separation of the different phases of crude oil which flow from producing wells as gas, oil, water and, if present, associated solid particles.

One separator for three phase mixtures, according to known technology, is illustrated in FIG. 1.

The separator essentially includes one horizontal vessel that, in order to facilitate the description of its operation, is considered divided in 5 different sections.

In the first section a preliminary separation and a reduction of the turbulence of the fluid entering from the inlet connection I is operated.

The separation is not complete because, due to fluid turbulence, part of the gas remains dispersed in the liquid phase while liquid droplets are carried over by the gas flow.

The liquid phases flow to the third section 3 through a stabilizing septum S, in order to evenly distribute the fluid, while the gas phase flows to the second section 2.

In the second section 2 the liquid droplets carried over are gradually separated from the gas and fall on the liquid phase that flows in the third section 3.

In order to obtain a correct separation by gravity, the gas flowing in the section 3 should maintain a reduced speed, along the separator, as necessary to guarantee the required separation efficiency.

However, before leaving the separator, the gas flows through a demister D that increases the final separation efficiency of the liquids carried over by the gas.

The third section 3 of the separator performs the gravity separation of the two liquid phases (water and oil).

In order to improve the liquid phase separation, the fluid can flow through a plate pack L, which has plates properly inclined and spaced, in order to reduce the operating time necessary for their separation by gravity.

The water, having a higher density than the oil, flows down toward the bottom, reaches the plate surface and is separated from the oil by coalescence effect.

The separated water flows, due to the inclination of the plates, towards the separator wall and reaches the bottom of the separator.

At the same time the oil, due to its lower density, flows in the opposite direction and is collected above the water level.

In the fourth section 4, located immediately after the plate pack, the separation of the water from the oil is completed.

The separated water is discharged from the bottom of the fourth section 4 through a vortex breaker 7 and a connection located in the bottom of the vessel, while the oil, which floats above the water surface, flows to the fifth section 5 overflowing a weir 6 utilized for this purpose.

From the fifth section 5 the oil is discharged passing through a vortex breaker and a connection 8 located in the bottom of the vessel.

A two phase separator, according to the prior art, is shown in FIG. 2.

Said two phase separator is realized by a cylindrical vertical vessel 10.

The gas and associated liquid enter the central zone of the separator through an inlet connection 11, while the separated gas leaves the separator through a connection 12 located in the top part of the vessel.

The separated liquid is discharged through a connection 13 after passing trough a vortex breaker located in the bottom of the separator vessel.

In the top of the two-phase separator 10, before the outlet connection 12, a demister D is utilized in order to improve the separation efficiency.

A disadvantage of said separators, operating according to known technology, is consequence of the considerable volume occupied by the gas, which is necessary for the separation of liquid droplets carried over by the gas which requires the utilization of vessels having considerable sizes.

An additional disadvantage of separators built according to the known technology is due to the turbulence of the entering fluid that requests a longer residence time of the liquids and consequently a larger volume to achieve the separation of the dispersed gas.

An additional disadvantage of the separators built according to the prior art is the lower total separation efficiency.

An additional disadvantage is due to the need to install a demister having a large volume as required for the separation of liquid particles from the gas. The purpose of the present invention is to provide three or two phase separators, utilizing a centrifugal device, for the separation of the gas phase from the fluid, said separators having a smaller size as compared to the size of separators according to the prior art which operate with a separation efficiency above 99% of liquid and solid particles, having a size of one micron or larger.

SUMMARY OF THE INVENTION

This and other results are reached using separators for three or two phase mixtures that are provided with a centrifugal device for the separation of the liquids from the gas which includes a centrifugal separation device (40, 70) placed at the inlet of the vessel (21, 64) for the separation of the gaseous phase from the incoming fluid stream characterized in that the aforesaid centrifugal separation device (40, 70) includes a first stage (40', 70') of annular section and an inner second stage (40", 70"), coaxial to the fist one; said first stage being deliminated between the vessel internal wall (42, 63) and the external wall of the second stage that includes an element (47) built with a steel plate having a spiral shape around the vertical axis of the centrifugal separation device, in order to separate the gas from liquids directing the flow through a circular pattern that brings the liquid and solid droplets into contact with the internal wall of the vessel (42, 63) in the first stage and with the internal wall of the spiral element (47) of the second stage, thus separating (from the gas) said liquid and solid droplets, which eventually fall by gravity into the lower section of the centrifugal separator (20, 60). Additional characteristics of the separators provided in accordance with our invention are described herein. The separator for three or two phase mixtures in accordance with the invention are provided with one centrifugal separation device installed inside a vertical cylindrical vessel connected, for a three phase separator the gas phase from a mixed fluid (as, for example, the crude oil produced by one or more wells in an oil field).

The centrifugal separation device includes a first stage having a circular section delaminated by the internal surface of the vertical cylindrical vessel and by the external surface of the second stage and a second stage, internal and coaxial to the first one, provided by a spirally wrapped plate.

The two stages are associated to form a centrifugal device utilized to perform the separation of the gas from the liquids by imparting to the circulating fluid a circular path that brings the liquid in contact with the external surfaces of the first and second stage.

The characteristics and the advantages of a three or two phase centrifugal separator, in accordance with the present invention, will result more evident from the following description, that is exemplifies but does not restrict the invention.

BRIEF DESCRIPTION OF THE SEVERAL VIEWS OF THE INVENTION

FIG. 1 schematically illustrates a system for the three phase separation in accordance with the prior art;

FIG. 2 schematically illustrates a system for the two phase separation in accordance with the prior art;

DETAILED DESCRIPTION OF THE INVENTION

Figure 3:
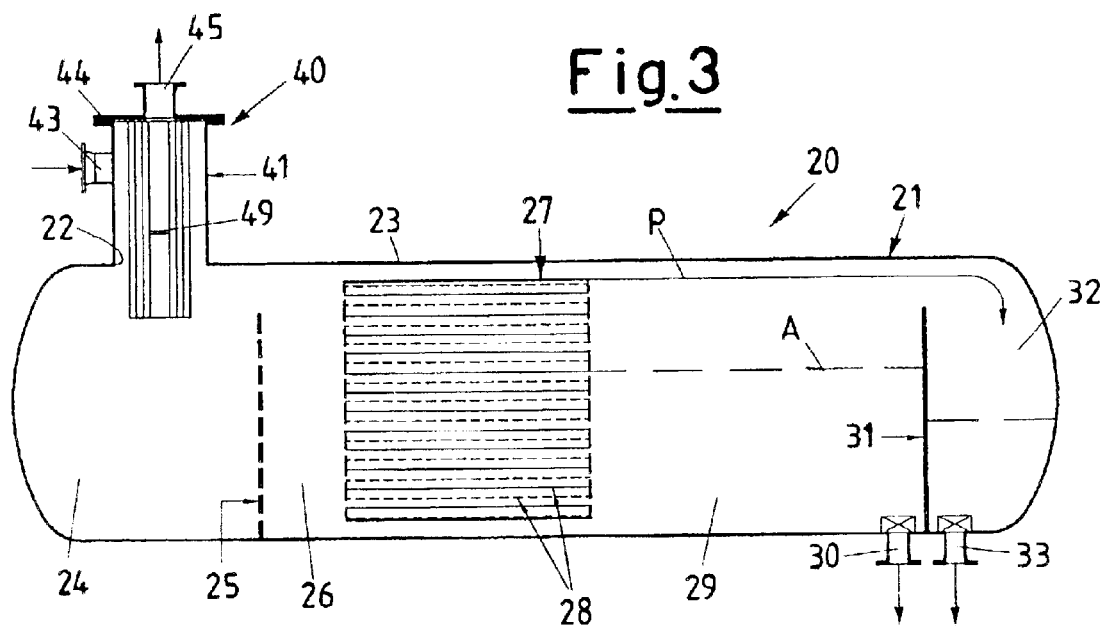
FIG. 3 is a schematic view of a system of three phase separation in accordance with the invention.

Referring to figures from 3 to 5b, a centrifugal separator for three phase mixtures includes an horizontal vessel 21 having an opening 22 made on the upper side of the cylindrical wall 23.

The centrifugal gas separation device 40 is connected to said opening 22, through which flows all the fluid arriving to the three phase centrifugal separator 20. The bottom of the centrifugal separation device 40 communicates with the first section 24 of the vessel 21.

The fluid flowing through a perforated diaphragm (calming baffle) 25 is stabilized before reaching the second section 26 containing a plate pack 27 utilized for the separation of the water from the oil.

The plate pack is formed by plates 28 having appropriate inclination and distance in order to separate by gravity the water (heavier) from the oil lighter).

The liquid phases leaving the plate pack, as water A on the bottom and oil P floating above the water before entering the third section 29.

The water is discharged through a connection 30 located on the bottom of the third section 29, while the oil, over-flowing above a weir 31, arrives to the fourth section 32 and is discharged through a bottom connection 33.

The centrifugal gas separation device 40 is designed and sized in order to perform a preliminary separation (close to a total separation) of the gas from the liquid phases.

The centrifugal separation device 40 includes a cylindrical vessel 41 delimited by a wall 42 and is provided with an inlet connection 43 for feeding the fluid to be treated.

The cylindrical vessel is terminated on top by a flange 44 having in the center an outlet connection 45 for the gas separated from the liquid phases.

The body of the cylindrical vessel 41, that is open in the bottom, delimits the first stage 40' of the centrifugal separation device and imparts a circular path to the inlet fluid which forces the liquid to adhere to the internal surface 42 and to fall inside the first section 24 of the vessel 21.

A second separation stage 40", that includes the element 47, is located inside the cylindrical vertical vessel 41. The element 47 is realized using a plate wrapped as an Archimedean spiral concentrically to the vertical axis of the centrifugal device 40.

Figure 5A:
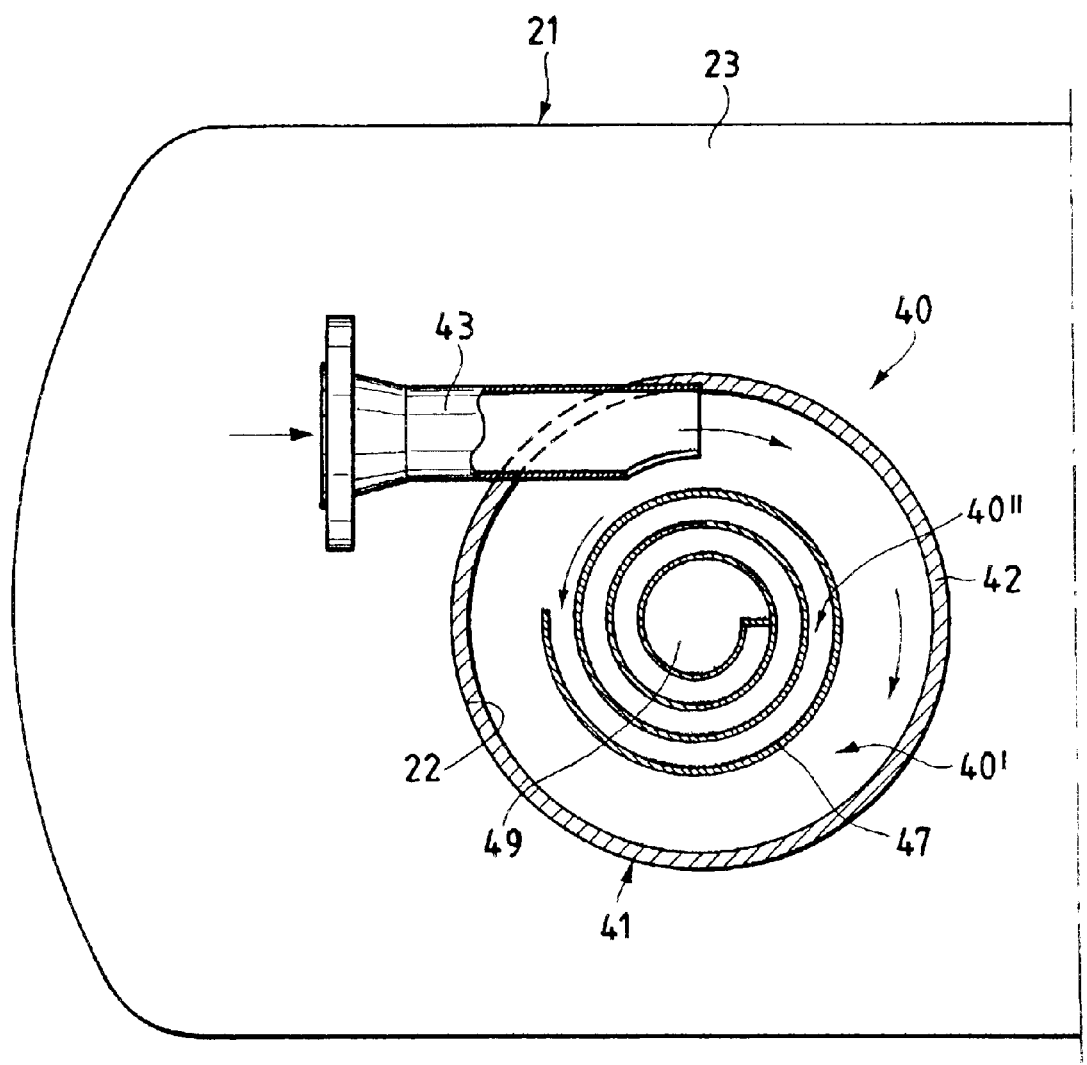
FIG. 5a is a plan view of the centrifugal device.
Figure 5B:
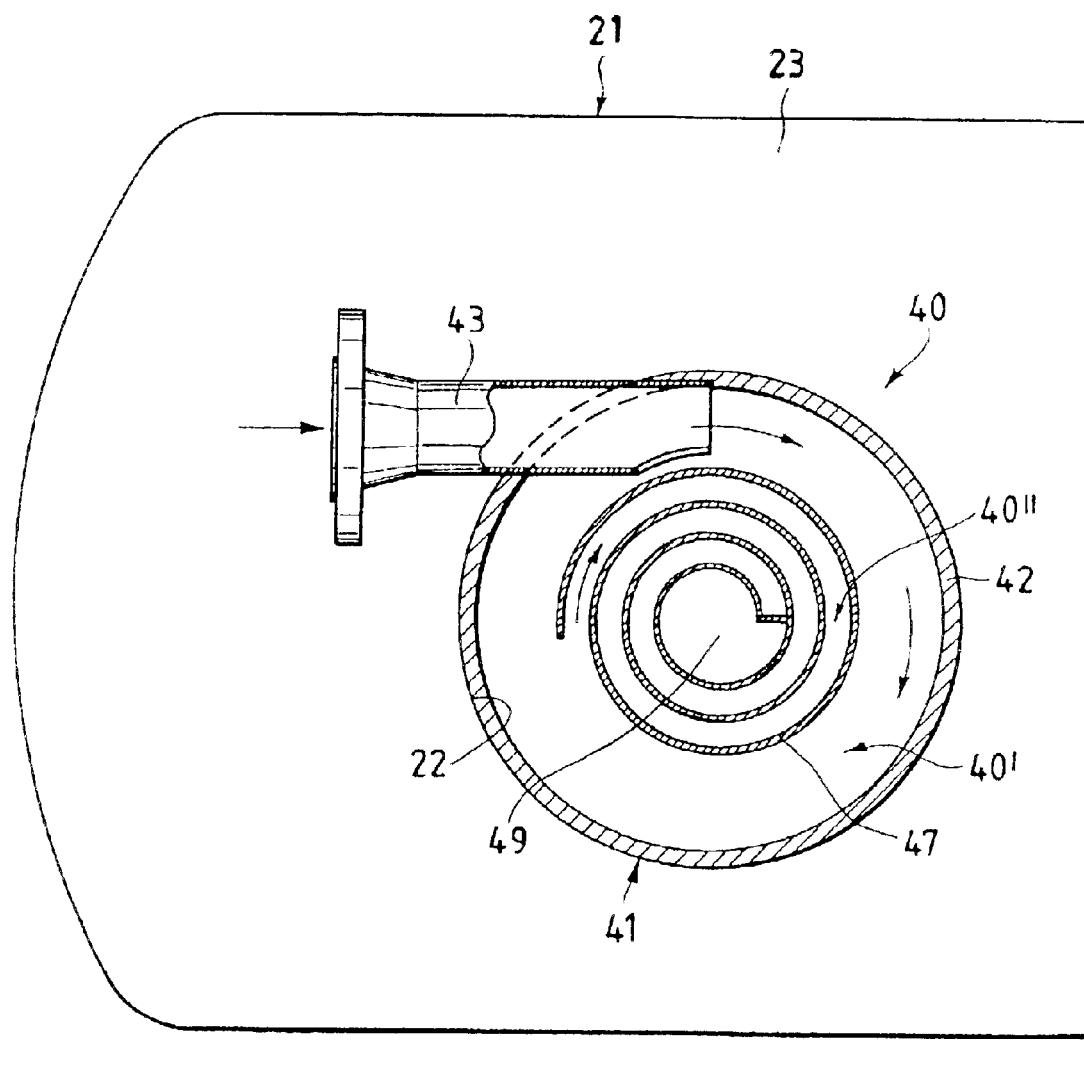
FIG. 5b is a plan view of the centrifugal device in accordance with a different realization of the invention.

The spiral and consequently the element 47 can be wrapped in such a way to obtain that the fluid flows in the second stage 42" in the same direction as in the first stage 40', as shown in FIG. 5a or, in accordance with a different realization, in the opposite direction as shown in FIG. 5b.

The element 47 includes, for normal applications, three complete revolutions, however in order to obtain a more complete separation, it is possible to realize a higher number of revolutions, extending the length of the fluid way inside the second stage 40".

In order to avoid to carry over any liquid from the first section 24 of the three phase centrifugal separator 20, due to the whirl caused by the gas that leaves the centrifugal separation device 40 through the outlet connection 45, a horizontal metallic plate 49 is installed in the lower side of the central revolution of the spiral 47 that separates said central zone of the second stage 40" from the first section 24 of the vessel 21 that is placed below.

The vapors that are released inside the vessel 21, above the liquid surface, are conveyed undisturbed to the centrifugal separation device 40 and through the same to the centrifugal separation element 47.

The lower portion of the element 47 is immersed in the liquid fluid under the liquid level 46.

Figure 6:
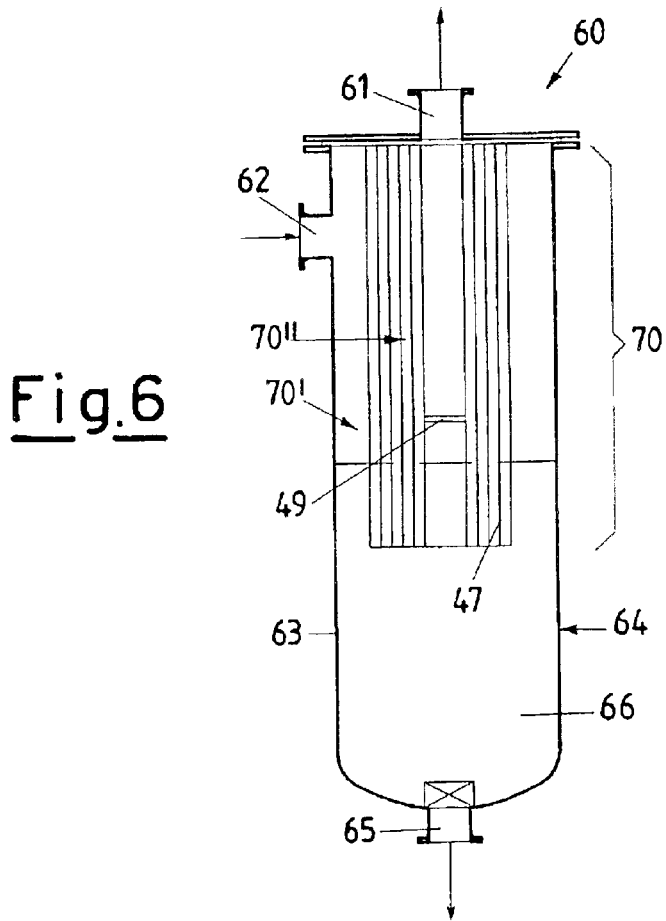
FIG. 6 is a front schematic view of a centrifugal two phase separator in accordance with the invention.

In accordance with one of the embodiments of the invention as shown in FIG. 6, the two phase separator 60 provided with the centrifugal separation device 70 is substantially simplified as compared to the three phase separator 20 (because the phases to be separated are only two: one liquid phase discharged from the bottom of the vessel and one gas phase discharged from the top of the vessel).

The two phase separator 60 includes one vertical cylindrical vessel 64 having an inlet connection 62 made on the upper part of the vessel wall 63 of the vessel 64.

The inlet connection 62 conveys the two phase fluid to a centrifugal separation device 70 essentially identical to the centrifugal separation device 40 associated to the three phase separator 20.

In the centrifugal separation device 70 the gas is separated from the liquid phase and is conveyed toward the outlet connection 61 located on the top of the vessel 64.

The liquid is collected on the bottom section 66 of the vessel 64 and is discharged through the outlet connection 65, provided with a vortex breaker, located in the bottom of the vessel.

The two separation stages 70' and 70" of the centrifugal separation device 70 are essentially identical to the equivalent centrifugal separation device of the three phase separator.

In the case of the two phase centrifugal separator, the centrifugal separation device is better integrated in the unit, as the external wall of the first stage is constituted by the wall 63 of the circular section of the vessel 64.

The element 47 of the second stage 70" of the centrifugal separation device 70 is wrapped as an Archimedean spiral concentric to the vertical axis of the vessel, with its central spiral 47a facing the outlet connection 61.

The centrifugal separation device needs, in order to perform the separation of the gas from the liquid, a very reduced space in comparison to the volume required by the two phase separators realized in accordance with the known technology.

In fact the bottom section 66 of the vessel 64, located under the centrifugal separation element, is totally available for collecting the separated liquid.

Figure 4A:
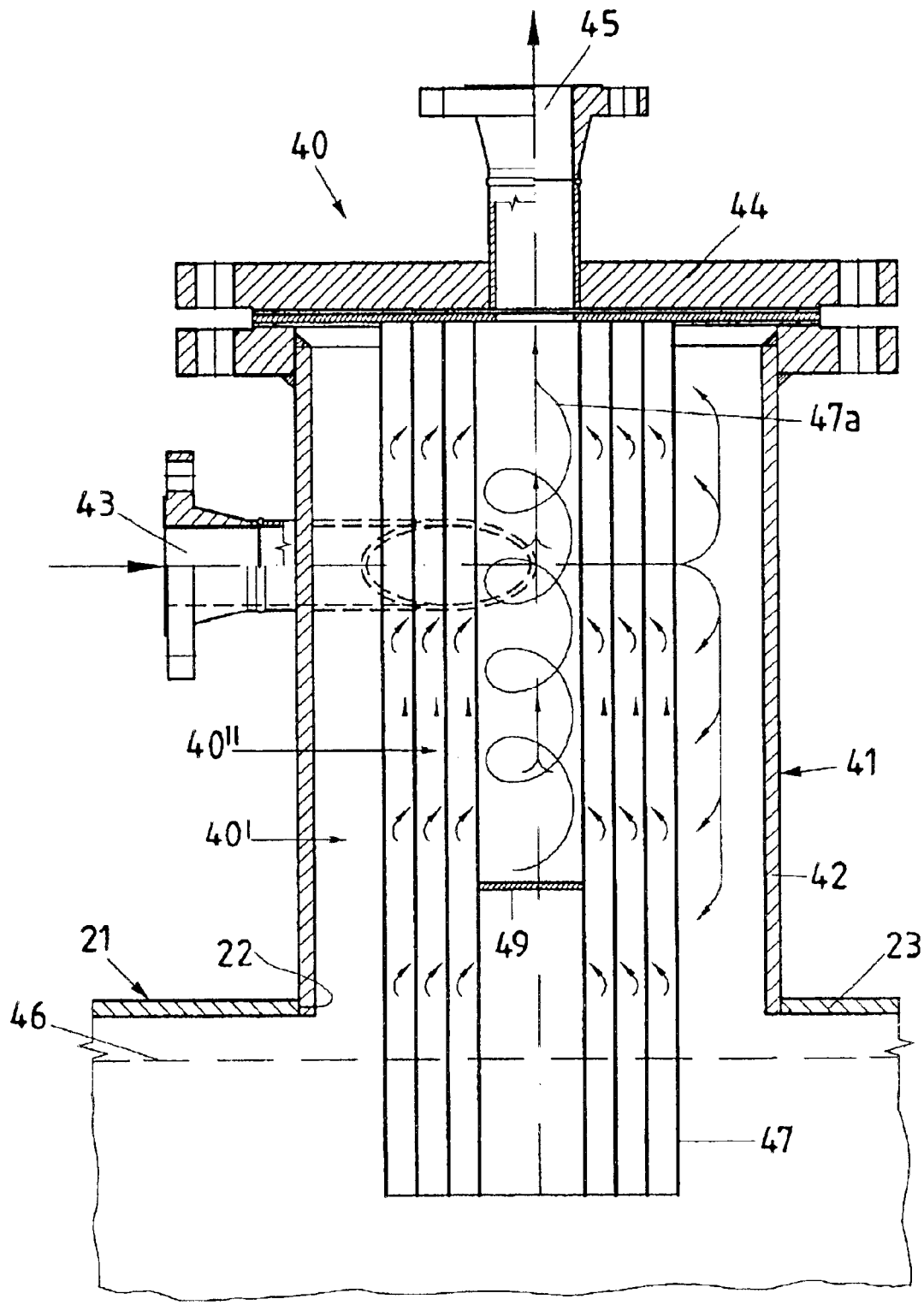
FIG. 4a is a front section view of the centrifugal device incorporated in the separator according to the invention.
Figure 4B:
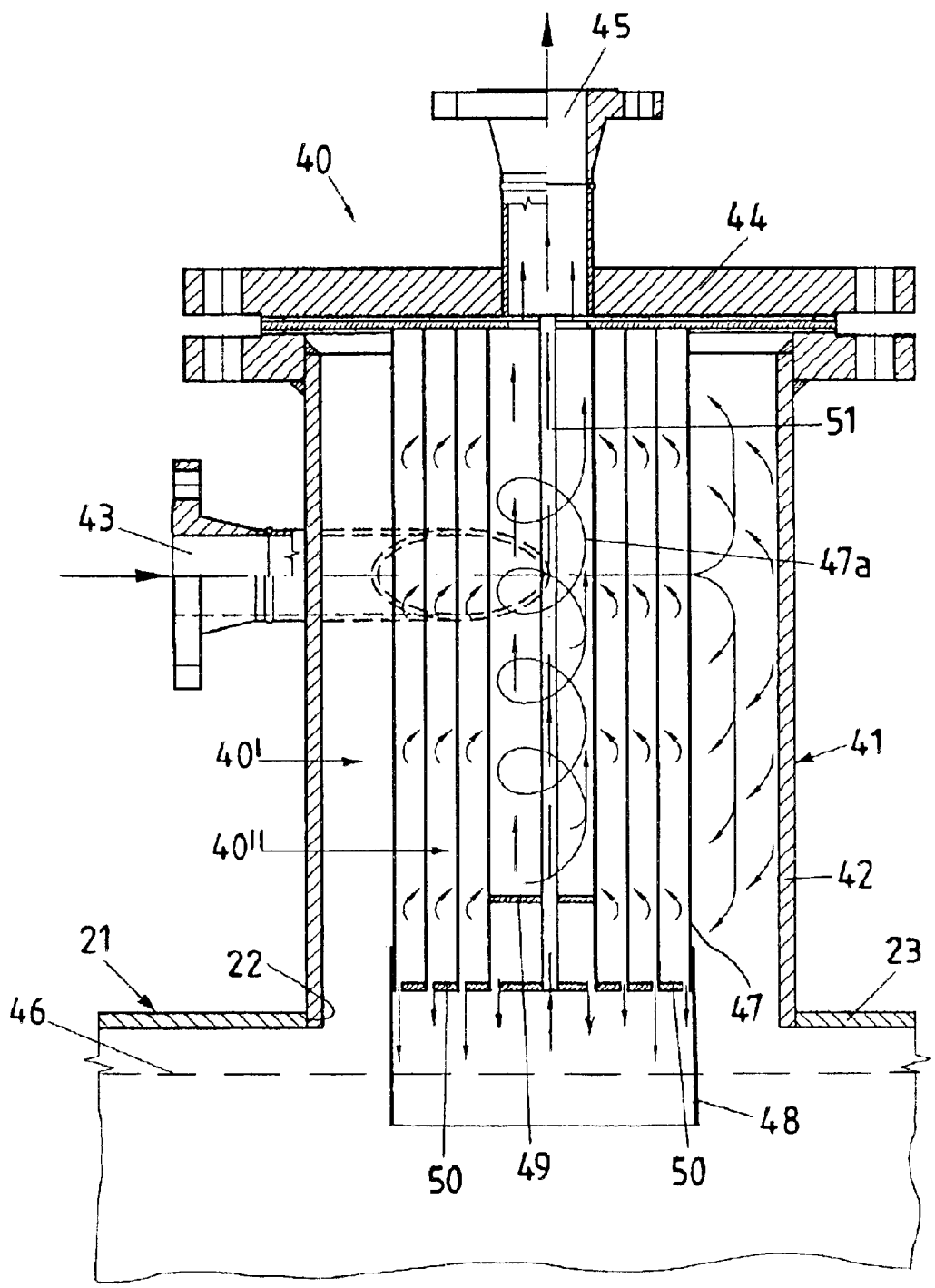
FIG. 4b is a front section view of the centrifugal device in accordance with a different embodiment of the invention.

In addition to this point, in accordance with a different realization as illustrated in FIG. 4b, the spirals, instead of being directly immersed in the liquid present in the section 24, 66 of the three or two phase centrifugal separator, are closed inside a cylindrical circular section 48 that is, in its turn, immersed in the liquid present in the section 24, 66 of the centrifugal three or two phase separator.

In this case the spirals are partially open in their lower part by means of a single helical groove 50 to facilitate the draining of the separated liquids with the support of a small gas leakage.

The gas is returned and is discharged through a pipe 51 passing through the central internal spiral 47a and through the metallic plate 49. The centrifugal devices for the gas separation from the liquids can be totally or partially welded inside and outside the vessels 20, 60 of the three or two phase centrifugal separators. As an alternative the centfirugal devices can be connected to said vessels in such a way to make them removable and partially or totally replaceable to facilitate their inspection or their partial or total replacement if necessary to adapt them to a variation of the operative conditions of the two or three phase centrifugal separators.

The connecting flange of the centrifugal separation device (in the case it is removable) can be utilized as a man way as normally required for the access to the inside of the vessel.

The centrifugal separation device 47 can include, in place of a single spiral element, more units, concentrically wrapped and parallel, each having at least three revolutions, where the fluid can move in the same direction of the first stage or in the opposite one.

The centrifugal separation device 40, 70 may be embodied as multiple centrifugal separation elements 47, working in parallel, all contained inside the cylindrical vertical vessel 41, 64.

A centrifugal three phase separator 20 can be made by multiple centrifugal separator devices 40, connected to the vessel with additional openings 22 made on the upper side of its cylindrical wall 21.

The inlet connection 43 and the outlet connection 45 of said centrifugal separation devices should be connected, outside the centrifugal separator 20, in order to operate in parallel.

It is also possible to modify existing three or two phase separators, made according to the prior art by making use of a centrifugal separation device 40, 70 in order to improve their separation efficiency.

Considering also the smaller size required by the centrifugal separation device compared to the diameter necessary for the installation of a demister, the two phase centrifugal separator, in accordance with the invention, requires a smaller vessel than a separator made in accordance with the prior art.

The centrifugal separation device reduces the turbulence of the fluids and consequently reduces the quantity of gas dispersed in the separated liquid.

What is claimed is:

1. Three-phase or two-phase separator, including a centrifugal separation device (40, 70) placed at an inlet of the vessel (21, 64) for the separation of the gaseous phase from the incoming fluid stream characterized in that the aforesaid centrifugal separation device (40, 70) includes a first stage (40',70') of annular section and an inner second stage (40", 70"), coaxial to the first one; said first stage being delimited between the vessel internal wall (42, 63) and the external wall of the second stage that includes an element (47) built with a steel plate having a spiral shape around the vertical axis of the centrifugal separation device, in order to separate the gas from liquids directing the flow through a circular pattern that brings the liquid and solid droplets into contact with the internal wall of the vessel (42, 63) in the first stage and with the internal wall of the spiral element (47) of the second stage, thus separating (from the gas) said liquid and solid droplets, which eventually fall by gravity into the lower section of the centrifugal separator (20, 60).

2. Separator according to claim 1, which includes the vessel (21) equipped with an opening (22) in the upper part of the cylindrical wall (23) connecting said vessel (21) to the centrifugal separation device (40) of the gas from the liquids.

3. Separator according to claim 2, where the element (47) is wrapped as an Archimedean spiral.

4. Separator according to claim 3, where said element (47) is wrapped along the flow direction in the first stage (co-rotating flow).

5. Separator according to claim 3, where said element (47) is wrapped in the opposite direction of the first stage (counter-flow).

6. Separator according to claim 4 or 5, where said element (47) is wrapped as a spiral for at least three concentric turns and the separated gas is carried out from the central inner coil (47a) through an outlet connection (45, 61) located in the upper part of the centrifugal separation device (40, 70).

7. Separator according to claim 6, where said centrifugal separation element (47) includes more spirals, parallel and concentric, each one built with at least three coils, co-rotating or counter-rotating with the first stage.

8. Separator according to claim 6, where the bottom of the central coil of the separation element (47) is closed by a horizontal plate (49), isolating said central coil from the lower section of the separator (24, 66) where the separated liquids are collected, in order to avoid that any liquid droplets, already separated, can be dragged and recycled by the whirl produced by the gas stream.

9. Separator according to claim 8, where the separation element (47) has an open bottom, dipped into the liquid collected in the section (24, 66) of the separator.

10. Separator according to claim 8, where the coils of the aforesaid separation element (47) are not dipped into the liquid collected in the section (24, 66) of the separator and are partially closed by a plate opened by a helicoidal groove (50), through which the separated liquid is discharged (with the aid of a very small draft of gas overflowing through the helicoidal opening) into a cylindrical section (48), welded to the aforesaid plate (50) and dipped into the liquid collected in the section (24, 66) of the separator.

11. Separator according to claim 10, where a pipe (51) is installed inside the central inner coil (47a) and through the steel plate (49) to allow the discharge of the gas overflowed with the separated liquid.

12. Separator for two or three-phase mixtures, built with more centrifugal separation devices (40, 70) operating in parallel, according to claim 1.

* * * * *